United States Patent
Regent

(10) Patent No.: US 7,392,067 B2
(45) Date of Patent: Jun. 24, 2008

(54) PORTABLE COMMUNICATION DEVICE WITH AN AUTOMATIC OPERATION-KEEPING SYSTEM AND METHOD OF KEEPING SUCH A DEVICE IN OPERATION

(75) Inventor: Nicolas Regent, Le Mans (FR)

(73) Assignee: NXP B.V., Eindhoven (NL)

( * ) Notice: Subject to any disclaimer, the term of this patent is extended or adjusted under 35 U.S.C. 154(b) by 1463 days.

(21) Appl. No.: 09/829,794

(22) Filed: Apr. 10, 2001

(65) Prior Publication Data
US 2001/0046888 A1 Nov. 29, 2001

(30) Foreign Application Priority Data
Apr. 11, 2000 (FR) ................................ 00 04641

(51) Int. Cl.
*H04B 1/38* (2006.01)
(52) U.S. Cl. .................... 455/572; 455/573; 379/433.08
(58) Field of Classification Search ......... 455/572–573, 455/574, 418, 343.1–343.6, 127.1; 370/311, 370/433.08
See application file for complete search history.

(56) References Cited

U.S. PATENT DOCUMENTS 5,036,532 A * 7/1991 Metroka et al. ............. 455/566
5,551,077 A * 8/1996 Oda ........................ 455/343.6
5,898,930 A * 4/1999 Terashima et al. ........... 455/572
5,910,944 A * 6/1999 Callicotte et al. ............ 370/311
5,995,814 A * 11/1999 Yeh .......................... 455/180.1
6,311,081 B1 * 10/2001 Northcutt et al. ............ 455/574
6,317,593 B1 * 11/2001 Vossler ..................... 455/414.1
6,408,196 B2 * 6/2002 Sheynblat et al. ........... 455/574
6,615,033 B1 * 9/2003 Cragun ...................... 455/502

FOREIGN PATENT DOCUMENTS

EP 0607919 A2 7/1994

* cited by examiner

*Primary Examiner*—Edward Urban
*Assistant Examiner*—Raymond S. Dean
(74) *Attorney, Agent, or Firm*—Peter Zawilski

(57) ABSTRACT

A device includes a main power source for supplying power, and a memory for storing an augmented time which is greater than a current time and is updated periodically using a first clock. An auxiliary power source supplies power to a second clock for providing the current time when the main power source is incapable of providing power. A controller powered by the auxiliary power source is configured to set a start time when main power source is incapable of providing power. The auxiliary power source does not supply power to the second clock.

22 Claims, 1 Drawing Sheet

PORTABLE COMMUNICATION DEVICE WITH AN AUTOMATIC OPERATION-KEEPING SYSTEM AND METHOD OF KEEPING SUCH A DEVICE IN OPERATION

The present invention relates to a portable communication device equipped with an automatic operation-keeping system. The invention also relates to a method of keeping the device in operation, which permits to guarantee its almost permanent operation.

The operation considered within the framework of the invention may be an active operation during which a communication actually takes place. However, the invention more particularly relates to keeping the device in the standby mode, in which it waits for a communication.

The invention finds applications, in essence, in the domain of mobile telephony, as well as that of portable computers equipped with a modem.

Document EP-A 0 607 919 discloses a portable telephone equipped with a surveillance system, which is capable of detecting a short break of power supply. The surveillance system is supplied with power by an auxiliary power source and is associated to a memory intended to store the operating state of a main processing unit. After a short break of power supply the surveillance system permits to resume the running processing based on the stored operating state.

When, on the other hand, the break of power supply exceeds a certain duration, it is considered a long power supply break and treated as a voluntary switch-off command. In that case, the stored data are no longer retained and the operation of the processing unit is initialized. The terms "in operation" and "out of operation" are used in the present text as being synonymous with an operating state of the device, active or standby, and a down state, respectively, where no communication whatsoever can take place.

A device as presented above makes a large auxiliary power source necessary to enable the operation of the surveillance system and of the memory. Placing such a power source may constitute a considerable constraint, for reasons of imperative cost reduction and cumbersomeness of portable communication devices.

On the other hand, when the device is without means for detecting short breaks in power supply, any break of power supply is treated as a voluntary switching off of the device. The device thus remains out of operation until the user activates a command to voluntarily switch the device on.

This situation is particularly annoying when the communication device is in a standby mode and when a break of power supply or another problem puts it out of operation without the user's knowing. Among the causes for accidentally putting a communication device out of operation may be mentioned, for example, a false contact, disconnection of batteries, result of a shock or a temporary disfunctioning of an element of the device. All these causes generally happen unnoticed by the user.

In the case of a portable telephone, the interruption of the standby mode prevents the user from receiving a call.

A certain number of portable telephones comprise a means which permits to program a time or a time of day at which the device starts functioning automatically. This programming permits to put the telephone in the standby mode, for example, at the time of day when a call is awaited. Also in this case the user is not safe from the fact that the device is put out of operation by accident, which occurs after the standby mode, and equally runs the risk of missing the call waited for.

The present invention has for its object to propose a system that permits to avoid the problems mentioned above.

It is a particular object of the invention to propose a communication device that is capable of being kept in a standby mode in a more reliable manner.

It is also an object to propose an operation-keeping system, which has a very low power consumption.

Finally, it is an object of the invention to propose a system that can be installed in portable telephones at less cost.

To attain these objects, it is more precisely an object of the invention to provide a communication device with a operation-keeping system, comprising:
a main power source,
a processing unit supplied with power by the main power source,
means for starting the device at a programmable start time.

In accordance with the invention, the device further includes:
a clock associated to an auxiliary power source, to produce a current time, and
means for automatically and periodically updating a start time after said current time, the electric power supply of the updating means being ensured solely by the main power source.

It is appropriate to point out here that the terms "start time" are used to indicate above all a start instant and do not necessarily imply a calculation of the time of day. The time may be expressed in days, it is true, but also in hours, minutes and/or seconds. The time may also be expressed in another unit linked, for example, with a clock pulse count.

The automatic programming means for programming a start time after the current time, which means may be included in the processing unit, are only supplied with power when the processing unit is in operation. Their power consumption is not supported by the auxiliary power source. The clock, on the other hand, is not affected when the processing unit is put out of operation.

When the device is put out of operation by accident, and particularly the processing unit, the automatic programming means cease to postpone the start time. Thus the current time, which evolves with the uninterrupted operation of the clock, may reach the last programmed start time. A new start is then provoked.

Between the instant at which the device is put out of operation by accident and the instant of the new start, the electric power consumption is, in essence, the consumption necessary for the operation of the clock. The power necessary for the operation of the clock is particularly small and may be supplied by a very simple auxiliary power source. This is, for example, an electric capacitor that is charged by the main power source during the normal operation of the device.

In a particular embodiment of the device, the device may comprise a register for storing the start time. This register is updated by automatic updating means to a time D, so that D=t+N, where N is a time value higher than or equal to an updating interval and where t is the current time. The interval is understood to mean the duration separating two successive updates, but does not of necessity imply that this duration is regular.

By way of example it is possible to reprogram the start time D every second by adding each time 2 seconds to the current time to obtain the new start time.

When the value of time added to the current time is higher than the update interval of the time D, an automatic start may be avoided as long as the normal operation of the device is not interrupted. For that matter, the choice of the value of time N permits to fix the maximum duration during which the device runs the risk of being put out of operation after an accidental stop.

To reduce the probability of receiving a communication during an accidental interruption of the operation, the value of time N added to the current time is preferably chosen to be low, for example, of the order of one or two seconds, and the update interval of the time is chosen to be high (every second, for example).

Here it may be observed that the operation-keeping system according to the invention is not a system that absolutely bans the accidental stop of the communication device, but permits to reduce the duration of the interruption of the operation to a value that is sufficiently low for the interruption not to have any impact on the user.

The invention also relates to a method of keeping a communication device in operation after it has been stopped accidentally, in which:

when the communication device is in operation, an automatic programmable start time is regularly updated to come after a current time, and in which when the communication device is stopped by accident, a new start is automatically made the moment when a current time established by a permanent clock coincides with the previously updated start time.

As indicated above, an accidental stop is understood to be a stop provoked, for example, by an power line disturbance, by a disfunctioning of a circuit or by any other cause that may escape the user's intention.

However, a voluntary stop may also be effected by the user, for example, by activating a control provided for this purpose. In that case, no new automatic start is effected. For this purpose, after a voluntary stop of the device, it is possible, for example, to interrupt the operation of the clock or to cancel the contents of a register provided for containing the programmed times of the starts.

Other characteristic features and advantages of the invention will appear from the description that follows with reference to the appended drawing Figures. This description is given for purely illustrative and non-limitative reasons.

FIG. 1 shows a processing unit 10 of a communication device such as a portable telephone.

Figure 1:
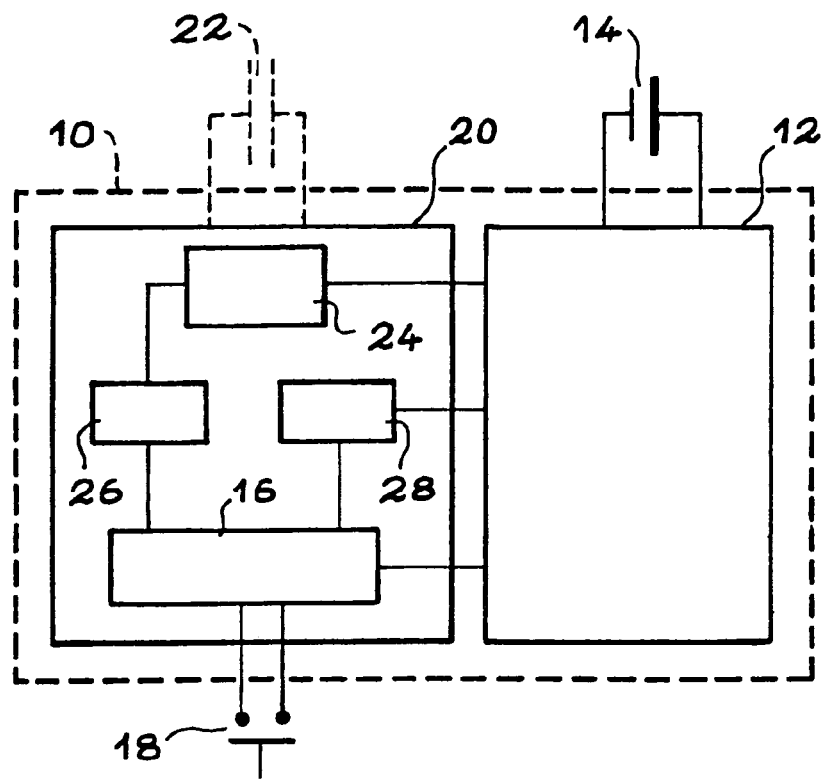
FIG. 1 is a diagrammatic representation of the main elements of a communication device in accordance with the invention.

The processing unit 10, for example, a microprocessor, comprises a first part 12 fed solely by an electric battery 14 which forms a main power source. The first part 12 ensures the main processing functions relating to the communication. These functions belonging to telephony are known per se and are thus not described here. The first part 12 also forms in the illustrated example the means for updating the start time.

The operation of the first part 12 of the processing unit is suspended after an accidental stop, such as in particular a stop resulting from a temporary power cut (power line disturbance) of the main power source.

A switch 18 that can be activated by the user is provided for starting the communication device and, in particular the first part 12. The switch is activated by the user notably to restart the device after a voluntary stop. It may be observed that the switch 18 is associated to start means 16. These means, of which the operation will be discussed at a later stage, also permit to restart the device automatically after an accidental stop.

A second part 20 of the processing unit is fed either by the main power source 14 during normal operation, or by an auxiliary power source 22 in case the main source is cut off. It comprises, in essence, a clock 24. The second part 20 is comparable to a standby system intended to induce an automatic start of the communication device, and more particularly of the first part 12, after an accidental disconnection of the power supply. The second part, that is to say, the standby part, can also be used for inducing the start of the device at a time programmed by the user.

The clock 24 of the second part, which may be different from a clock (not shown) of the first part 12, is preferably a low-frequency clock to limit its power consumption. By way of example, a clock having a frequency of 32 kHz may function with a current that is as low as 25 mA.

With such a low power consumption, it is not necessary to expressly provide an auxiliary power supply source. In the example of the Figure, a capacitor 22 represents the sum of the electric capacitances which normally exist in a communication device such as a portable telephone. They are, for example, filter capacitances which are there for the main power source. The capacitor 22 thus constitutes here the auxiliary power source.

A first register 26 connected to the clock 24 contains a value that represents a current time. The contents of this register are continuously renewed or incremented by the clock, even when the communication device is stopped accidentally.

A second register 28 is provided for containing an automatic start time. In the figure one may notice that this register is linked to the first part 12 of the processing unit. This processing unit is programmed for periodically renewing the contents of the second register 28 and carrying same to a value that corresponds to a time later than the current time contained in the first register 26.

Finally, the two registers 26, 28 are connected to the start means 16. The start means 16 include a comparator for comparing the contents of the two registers 26 and 28 and prompt the start of the device if the values turn out to be the same. The prompting caused by the means 16 is then equivalent to the external switch 18 being turned on by the user.

It should be observed here that the FIG. 1 distinguishes the various elements of the device by being based, in essence, on their function in order to simplify the description thereof. However, the various functions of comparing the contents of the registers etc. may be accomplished by simply programming a microprocessor of the processing unit 10.

The use of the invention is particularly economic for portable telephones, which comprise a delayed start system that permits to put them in the standby mode on the basis of a time or a time of day selected by the user. These telephones are already equipped with start means 16 mentioned earlier. It is then sufficient to program the processing unit and, more particularly, the first part 12, so that the start time is periodically renewed when the telephone is in operation.

Figure 2:
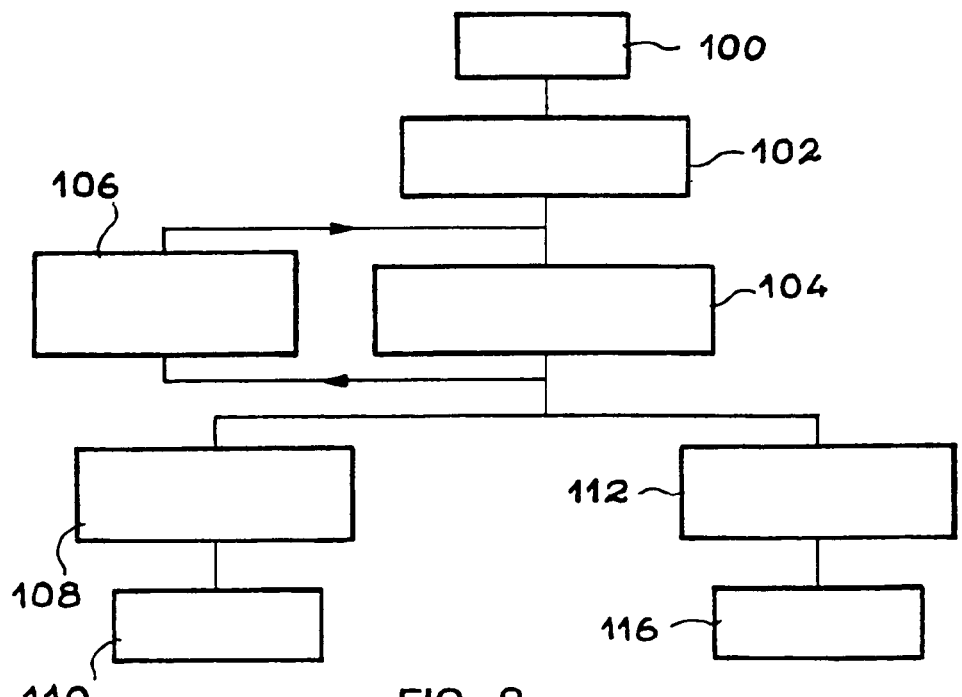
FIG. 2 is a flow chart illustrating the operation of a device in accordance with the invention.

FIG. 2 described hereinafter summarizes the operation of a device in accordance with the invention.

A first step represented by box 100 corresponds to starting the communication device. This corresponds to a command from the switch 18 of FIG. 1 by the user. The device is then, either in the effective communication mode or in a standby mode, waiting for a communication. The initial start 100 may also result from a delayed start whose time will have been programmed by the user beforehand (if this function is available).

A second step operated by the processing unit is represented by box 102. This step corresponds to the activation of the clock 24 (FIG. 1) of the surveillance system and to the loading in the second register 28 (FIG. 1) of a value D that corresponds to t+N, where t is the current time and N is an increment by 2 sec, for example.

A following box 104 corresponds to the normal operation of the processing unit and, in particular, of the first part of this unit. The box 104 is running in parallel with a box 106, which corresponds to a new update of the value contained in the second register. The update is made periodically by the first part of the processing unit. As long as the first part of the processing unit operates in normal fashion, the programmed start time (and without a renewed stop) is not reached by the count of the clock.

The operation may be stopped by the user by voluntarily deactivating the surveillance system. This command, indicated by reference 108, ends in a stop 110. In this case no new automatic start is possible without the user's voluntary intervention.

Box 112 corresponds to the elapse of the programmed time in the second register. This means that the current time has become identical with the programmed start time. This situation only occurs when the second register stops being updated, that is to say, after an accidental stop of the device, which suspends the operation of the first part of the processing unit. The result is a new automatic start indicated by box 116.

The invention claimed is:

1. A communication device equipped with an automatic operation-keeping system, said communication device comprising:
   a main power source
   a processing unit supplied with power by the main power source, and
   means for starting the device at a programmable start time including:
   a clock to produce a current time, said clock being supplied with power from an auxiliary power source when said main power source is incapable of supplying power, and
   means for automatically and periodically updating the start time to be greater than said current time, wherein said auxiliary power source does not supply power to said updating means when said main power source is incapable of supplying said power.

2. A communication device as claimed in claim 1, in which the processing unit comprises the automatic updating means for updating the start time.

3. A communication device as claimed in claim 1, comprising a register for storing start times, updated by the automatic updating means to a time D, so that D=t+N, where N is a time value higher than or equal to a start interval and where t is the current time.

4. A communication device as claimed in claim 1, in which the auxiliary power source comprises an electric capacitance.

5. A device as claimed in claim 1, characterized in that the device is a portable telephone.

6. A method of keeping a device in operation after a main power source is incapable of supplying power to said device, the method comprising the acts of:
   updating a start time to come after a current time when the communication device is in operation by an updating means,
   providing power to a clock by an auxiliary power source when main power source is incapable of supplying said power, wherein said auxiliary power source does not supply power to said updating means when said main power source is incapable of supplying said power, and
   when the main power source is incapable of supplying said power, making a new start when a current time established by said clock coincides with a previously updated start time.

7. A method as claimed in claim 6, in which start time is updated by adding a time increment to the current time.

8. A method as claimed in claim 7, in which the start time is updated with a shorter interval than a value of the time increment.

9. A device as claimed in claim 1, characterized in that the start time is measured from the current time as an instantaneous value in seconds.

10. A device as claimed in claim 9 wherein the number of seconds in the instantaneous value is measured as a number of pulses of the clock.

11. A device as claimed in claim 1, characterized in that the processing unit comprises a first part that is supplied with power by the main power source and a second part that can be supplied with power either by the main power or the auxiliary power source if the main power source fails.

12. A device claimed in claim 11, characterized in that the second part further comprises at least one register for retaining the current time and the start time.

13. A method as claimed in claim 6, characterized in that the start time is measured from the current time in as an instantaneous value measured in seconds.

14. A method as claimed in claim 13, wherein the number of seconds in the instantaneous value is measured as a number of pulses of the clock.

15. A method of keeping a device in operation after it has been stopped accidentally comprising:
   when the device is in operation,
      supplying power from a main power source to both a first part and a second part of a processing section for the device, and
      regularly updating an automatic programmable start time to come after a current time; and
   when the device is stopped by accident,
      supplying power to the second part from an auxiliary power source, and not supplying power to the first part, and
      automatically making a new start when a current time established by a clock coincides with the previously updated start time.

16. A method as claimed in claim 15, wherein the second part contains at least one register that retains the current time and start time.

17. A method as claimed in claim 15, wherein there are at least a first clocking device operatively connected to the first part and a second clocking device operatively connected to the second part, where the second clocking device is powered by the auxiliary power source.

18. A method as claimed in claim 17, wherein the second clocking is a low frequency clocking device.

19. A method as claimed in claim 15, wherein the auxiliary power source is a capacitance.

20. A method as claimed in claim 19, wherein the capacitance forming the auxiliary power source is a sum of filter capacitors.

21. A device comprising:
   a main power source for supplying power;
   a memory for storing an augmented time which is greater than a current time and is updated periodically using a first clock;
   an auxiliary power source for supplying power to a second clock for providing said current time when said main power source is incapable of providing power; and a controller powered by said auxiliary power source, said controller being configured to set a start time when said main power source is incapable of providing said power, wherein said auxiliary power source does not supply power to said first clock when said main power source is incapable of supplying said power.

22. The device of claim 21, wherein said controller is configured to set the start time when said current time provided by said clock equals said augmented time stored in said memory.

* * * * *